United States Patent
Lee et al.

(10) Patent No.: US 9,292,499 B2
(45) Date of Patent: Mar. 22, 2016

(54) AUTOMATIC TRANSLATION AND INTERPRETATION APPARATUS AND METHOD

(71) Applicant: Electronics and Telecommunications Research Institute, Daejeon (KR)

(72) Inventors: Soo-Jong Lee, Daejeon (KR); Sang-Hun Kim, Daejeon (KR); Jeong-Se Kim, Daejeon (KR); Seung Yun, Daejeon (KR); Min-Kyu Lee, Daejeon (KR); Sang-Kyu Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 144 days.

(21) Appl. No.: 14/161,593

(22) Filed: Jan. 22, 2014

(65) Prior Publication Data
US 2014/0303957 A1    Oct. 9, 2014

(30) Foreign Application Priority Data
Apr. 8, 2013 (KR) .................. 10-2013-0037936

(51) Int. Cl.
*G06F 17/28* (2006.01)
*G10L 13/00* (2006.01)
*G10L 15/10* (2006.01)

(52) U.S. Cl.
CPC .............. *G06F 17/289* (2013.01); *G10L 15/10* (2013.01)

(58) Field of Classification Search
CPC .............. G06F 17/289; G06F 17/2863; G06F 17/2872; G06F 17/2818; G10L 15/26; G10L 13/00
USPC .................. 704/2, 260, 277, 4, 266
See application file for complete search history.

(56) References Cited

U.S. PATENT DOCUMENTS

| | | | | |
|---|---|---|---|---|
| 6,141,642 | A * | 10/2000 | Oh ................. | 704/260 |
| 2006/0136216 | A1* | 6/2006 | Shen et al. ........... | 704/266 |
| 2009/0055158 | A1* | 2/2009 | Xu et al. .............. | 704/2 |
| 2009/0204401 | A1* | 8/2009 | Bu ..................... | 704/260 |
| 2011/0307241 | A1* | 12/2011 | Waibel et al. ........ | 704/2 |

FOREIGN PATENT DOCUMENTS

| | | |
|---|---|---|
| JP | 2002-288167 A | 10/2002 |
| KR | 10-2004-0015638 A | 2/2004 |
| KR | 10-2010-0068965 A | 6/2010 |
| KR | 10-2012-0044205 A | 5/2012 |

* cited by examiner

*Primary Examiner* — Charlotte M Baker

(57) ABSTRACT

The present invention relates to an automatic translation and interpretation apparatus and method. The apparatus includes a speech input unit for receiving a speech signal in a first language. A text input unit receives text in the first language. A sentence recognition unit recognizes a sentence in the first language desired to be translated by extracting speech features from the speech signal received from the speech input unit or measuring a similarity of each word of the text received from the text input unit. A translation unit translates the recognized sentence in the first language into a sentence in a second language. A speech output unit outputs uttered sound of the translated sentence in the second language in speech. A text output unit converts the uttered sound of the translated sentence in the second language into text transcribed in the first language and outputs the text.

20 Claims, 13 Drawing Sheets

AUTOMATIC TRANSLATION AND INTERPRETATION APPARATUS AND METHOD

CROSS REFERENCE TO RELATED APPLICATION

This application claims the benefit of Korean Patent Application No. 10-2013-0037936 filed on Apr. 8, 2013, which is hereby incorporated by reference in its entirety into this application.

BACKGROUND OF THE INVENTION

1. Technical Field

The present invention relates generally to an automatic translation and interpretation apparatus and method and, more particularly, to an automatic translation and interpretation apparatus and method, which allow persons who use different languages to easily communicate with each other.

2. Description of the Related Art

As well known in the art, an automatic translation and interpretation apparatus is a device for allowing persons who use different languages to communicate with each other using their own languages, and is configured to receive a speech signal, perform speech recognition, automatically translate the results of recognition into a second language, combine the results of the translation with speech, and output the resulting speech. However, since uttered sound immediately disappears, there is a problem in that it is impossible to directly reproduce a second language and utilize the reproduced second language for communication.

Further, since in the case of proper nouns having low frequency of use or in a noise environment, speech recognition performance is rapidly deteriorated, wherein there is a need to perform communication by directly entering a text sentence, or to directly utter the second language without using automatic interpretation.

Further, although an existing automatic translation engine is executed on text sentences and then sentences to be translated are assumed to be grammatically or semantically perfect, results transferred from a speech recognition engine to an automatic translation engine do not satisfy such assumptions, so that recognition error appearing in speech recognition negatively influences translation, thus resulting in a phenomenon in which the degree of error further increases after translation has been performed. In order to solve such a problem, an existing automatic interpretation apparatus attempts to solve such a problem by automatically retranslating the results of automatic translation into the second language into the first language and allowing a user to check the results.

In relation to this, Korean Patent Application Publication No. 10-2010-0068965 discloses technology entitled "Automatic interpretation apparatus and method."

SUMMARY OF THE INVENTION

Accordingly, the present invention has been made keeping in mind the above problems occurring in the prior art, and an object of the present invention is to provide an automatic translation and interpretation apparatus and method, which not only automatically translate and interpret a first language into a second language based on uttered sound or text in the first language, but also output the uttered sound of the translated and interpreted second language in speech or text transcribed in the first language, thus enabling the translated and interpreted second language to be reproduced in a user's own voice.

Another object of the present invention is to provide an automatic translation and interpretation apparatus and method, which can exactly extract intended words via the measurement of a similarity between words when there is a typing error or an orthographic error, upon inputting text in a first language.

In accordance with an aspect of the present invention to accomplish the above objects, there is provided an automatic translation and interpretation apparatus including a speech input unit for receiving a speech signal in a first language; a text input unit for receiving text in the first language; a sentence recognition unit for recognizing a sentence in the first language desired to be translated by extracting speech features from the speech signal received from the speech input unit or measuring a similarity of each word of the text received from the text input unit; a translation unit for translating the recognized sentence in the first language into a sentence in a second language; a speech output unit for outputting uttered sound of the translated sentence in the second language in speech; and a text output unit for converting the uttered sound of the translated sentence in the second language into text transcribed in the first language and outputting the text.

Preferably, the sentence recognition unit may include a speech signal reception unit for receiving the speech signal from the speech input unit; a speech section separation unit for separating a speech section and a non-speech section from the received speech signal; a speech feature extraction unit for extracting the speech features from the speech section; a similarity measurement unit for measuring a similarity of each word of text data received from the text input unit and extracting a translation word having a maximum similarity; and a sentence extraction unit for extracting the speech features or the translation word in a form of the sentence in the first language using a sentence recognition module that is based on an acoustic model, a pronunciation dictionary, and a language model constructed using a speech database (DB) or a word DB, and outputting the sentence in the first language.

Preferably, the similarity measurement unit may include a comparison unit for comparing words stored in a translation word DB with each word of the input text; a first calculation unit for calculating a similarity by dividing a number of identical phonemes based on results of the comparison by a number of phonemes of each word of the input text; a second calculation unit for calculating a similarity by dividing the number of identical phonemes based on the results of the comparison by a number of phonemes of each word stored in the translation word DB; a third calculation unit for calculating a similarity by dividing a minimum value of the similarity values calculated by the first calculation unit and the second calculation unit by an average of the number of phonemes of the word of the text and the number of phonemes of the word stored in the translation word DB; and a translation word extraction unit for extracting, from the translation word DB, a translation word having a maximum similarity, which is similar to similarity values calculated by the first calculation unit, the second calculation unit, and the third calculation unit.

Preferably, the translation word DB may store translation words including corresponding words in the second language into which words in the first language are translated, or corresponding words in the first language into which words in the second language are translated.

Preferably, the text output unit may include a Korean/English text output unit for converting the uttered sound of the translated sentence in the second language into text transcribed in Roman letters and outputting Romanized text when the first language is English and the second language is Korean.

Preferably, the Korean/English text output unit may include a first preprocessing unit for performing preprocessing to eliminate special symbols from the translated sentence in the second language; an uttered sound conversion unit for converting the uttered sound of the sentence in the second language into uttered sound in the first language using a pre-constructed pronunciation conversion DB; a first sentence separation unit for separating the sentence in the second language into words by word spacing using a pre-constructed Korean/English translation word DB; a word division unit for dividing each separated word into syllables and phonemes using the pre-constructed Korean/English translation word DB; a first transcription unit for transcribing the converted uttered sound in phoneme-based Romanized text using a pre-constructed phoneme-based Roman letter DB; and a first combination unit for combining phonemes of the Romanized text into syllables and words and outputting results of the combination.

Preferably, the text output unit may include an English/Korean text output unit for converting the uttered sound of the translated sentence in the second language into text transcribed in Korean letters and outputting the Korean text when the first language is Korean and the second language is English.

Preferably, the English/Korean text output unit may include a second preprocessing unit for performing preprocessing to eliminate special symbols from the translated sentence in the second language; a second sentence separation unit for separating the translated sentence in the second language into words by word spacing using a pre-constructed English/Korean translation word DB; a second transcription unit for transcribing uttered sound of each separated word in Korean text; and a second combination unit for combining words of the Korean text into a sentence and outputting the sentence.

In accordance with another aspect of the present invention to accomplish the above objects, there is provided an automatic translation and interpretation method including receiving, by a speech input unit, a speech signal in a first language; receiving, by a text input unit, text in the first language; recognizing, by a sentence recognition unit, a sentence in the first language desired to be translated by extracting speech features from the speech signal received from the speech input unit or measuring a similarity of each word of the text received from the text input unit; translating, by a translation unit, the recognized sentence in the first language into a sentence in a second language; outputting, by a speech output unit, uttered sound of the translated sentence in the second language in speech; and converting, by a text output unit, the uttered sound of the translated sentence in the second language into text transcribed in the first language and outputting the text.

Preferably, recognizing the sentence in the first language desired to be translated may include receiving the speech signal from the speech input unit; separating a speech section and a non-speech section from the received speech signal; extracting the speech features from the speech section; measuring a similarity of each word of text data received from the text input unit, and extracting a translation word having a maximum similarity; and extracting the speech features or the translation word in a form of the sentence in the first language using a sentence recognition module that is based on an acoustic model, a pronunciation dictionary, and a language model constructed using a speech DB or a word DB, and outputting the sentence in the first language.

Preferably, measuring the similarity of each word of the text data received from the text input unit and extracting the translation word having the maximum similarity may include comparing words stored in a translation word DB with each word of the input text; calculating a similarity by dividing a number of identical phonemes based on results of the comparison by a number of phonemes of each word of the input text; calculating a similarity by dividing the number of identical phonemes based on the results of the comparison by a number of phonemes of each word stored in the translation word DB; calculating a similarity by dividing a minimum value of the calculated similarity values by an average of the number of phonemes of the word of the text and the number of phonemes of the word stored in the translation word DB; and extracting, from the translation word DB, a translation word having a maximum similarity, which is similar to the above calculated similarity values.

Preferably, converting the uttered sound of the translated sentence in the second language into text transcribed in the first language and outputting the text may include converting the uttered sound of the translated sentence in the second language into text transcribed in Roman letters and outputting Romanized text when the first language is English and the second language is Korean.

Preferably, converting the uttered sound of the translated sentence in the second language into the text transcribed in Roman letters and outputting the Romanized text when the first language is English and the second language is Korean may include performing preprocessing to eliminate special symbols from the translated sentence in the second language; converting the uttered sound of the sentence in the second language into uttered sound in the first language using a pre-constructed pronunciation conversion DB; separating the translated sentence in the second language into words by word spacing; dividing each separated word into syllables and phonemes; transcribing the converted uttered sound in phoneme-based Romanized text using a pre-constructed phoneme-based Roman letter DB; and combining phonemes of the Romanized text into syllables and words and outputting results of the combination.

Preferably, converting the uttered sound of the translated sentence in the second language into text transcribed in the first language and outputting the text may include converting the uttered sound of the translated sentence in the second language into text transcribed in Korean letters and outputting the Korean text when the first language is Korean and the second language is English.

Preferably, converting the uttered sound of the translated sentence in the second language into text transcribed in Korean letters and outputting the Korean text when the first language is Korean and the second language is English may include performing preprocessing to eliminate special symbols from the translated sentence in the second language; separating the translated sentence in the second language into words by word spacing; transcribing uttered sound of each separated word in Korean text; and combining words transcribed in the Korean text into a sentence and outputting the sentence.

The automatic translation and interpretation apparatus and method according to the present invention having the above configuration are advantageous in that they not only automatically translate a first language into a second language based on uttered sound or text in the first language, but also output the uttered sound of the translated second language in speech or text transcribed in the first language, so that an opportunity to reproduce the translated and interpreted second language in a user's own voice is provided, thus allowing persons who use different languages to easily communicate with each other.

Further, the present invention is advantageous in that, when there is a typing error or an orthographic error upon inputting text in a first language, intended words can be extracted via the measurement of a similarity between words, so that the first language can be accurately translated and interpreted into the second language, thus improving the quality of automatic translation and interpretation service.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
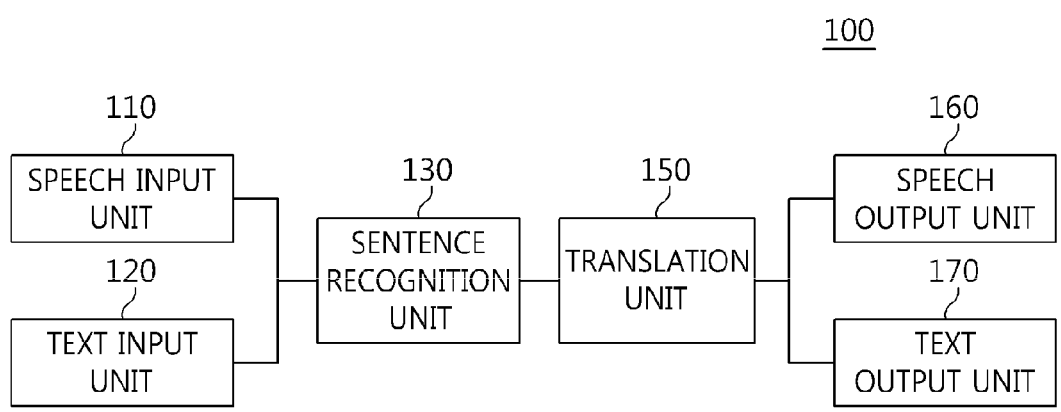
FIG. 1 is a configuration diagram showing an automatic translation and interpretation apparatus according to an embodiment of the present invention.

Hereinafter, preferred embodiments of the present invention will be described in detail with reference to the attached drawings so as to describe in detail the present invention to such an extent that those skilled in the art can easily implement the technical spirit of the present invention. Reference now should be made to the drawings, in which the same reference numerals are used throughout the different drawings to designate the same or similar components. In the following description, detailed descriptions of related known elements or functions that may unnecessarily make the gist of the present invention obscure will be omitted.

An automatic translation and interpretation apparatus and method according to the present invention are configured to construct an interface for transcribing each language sentence into a foreign language based on uttered sound (or pronunciation), and to more exactly transcribe text input into the foreign language even if errors such as misspellings or omitted letters occur in the text input. First, in order to transcribe a sentence in each language into a foreign language based on the uttered sound of the sentence, an algorithm and a relevant database (DB) associated with a procedure for converting a Korean sentence into a Roman sentence based on the uttered sound of the Korean sentence are constructed. An algorithm and a relevant DB associated with a procedure for converting an English sentence into a Korean sentence based on the uttered sound of the English sentence are constructed.

Further, the classification of languages in the present invention is performed such that, in the case of automatic Korean/English translation and interpretation, when Korean is set to a first language, a second language is English, and such that when English is set to a first language, a second language is Korean. In the present invention, for convenience of description, the first language is Korean and the second language is English, but the languages of the present invention are not limited thereto and may be any languages.

Furthermore, the automatic translation and interpretation apparatus according to the present invention is provided in a mobile terminal in the form of an application. On the screen of the mobile terminal, an automatic translation/interpretation setting button (not shown) is provided to enable the setting of a procedure for determining a language pair requiring automatic interpretation, a procedure for setting voice to male voice or female voice when outputting an interpreted sentence in speech, a procedure for determining whether to delete automatic translation and interpretation records, etc. Further, on the screen of the mobile terminal, an utterance start button, an utterance end button, a text input start button, and a text input end button are provided, thus enabling a text sentence as well as utterance to be directly input.

Hereinafter, an automatic translation and interpretation apparatus and method according to embodiments of the present invention will be described in detail with reference to the attached drawings.

FIG. 1 is a diagram showing the configuration of an automatic translation and interpretation apparatus according to an embodiment of the present invention.

Referring to FIG. 1, an automatic translation and interpretation apparatus 100 according to the present invention includes a speech input unit 110, a text input unit 120, a sentence recognition unit 130, a translation unit 150, a speech output unit 160, and a text output unit 170.

The speech input unit 110 receives an audio speech signal (or simply "speech signal") in a first language. The speech input unit 110 receives the speech signal in the first language speech via a procedure for starting utterance (speaking) after a user who uses the first language presses an utterance start button, and for pressing an utterance end button after utterance is completed. In this case, the speech input unit 110 receives the speech signal through a microphone mounted in a mobile terminal.

The text input unit 120 receives text in the first language. The text input unit 120 receives the text in the first language via a procedure for starting to input text after the user who uses the first language presses a text input start button and for pressing a text input end button after the input of the text is completed. In this case, the text input unit 120 receives text through a keypad provided on the mobile terminal.

The sentence recognition unit 130 extracts speech features from the speech signal received from the speech input unit 110 or measures the similarity of each word of the text received from the text input unit 120, and thus recognizes a sentence in the first language desired to be translated. An embodiment related to the configuration of the sentence recognition unit 130 will be described in detail later with reference to FIG. 2.

The translation unit 150 translates the recognized first language sentence into a sentence in the second language.

The speech output unit 160 outputs the uttered sound of the translated second language sentence in speech through a speaker.

The text output unit 170 converts the uttered sound of the translated second language sentence into text transcribed in the first language, and outputs the first language text. The text output unit 170 is configured to, for the Korean sentence "안녕하세요?" and the English sentence "How are you?", transcribe the uttered sound of the Korean sentence "안녕하세요?" in the Romanized text "(Annyeong_Haseyo?)" and the uttered sound of the English sentence "How are you?" in the Korean text "(하우 아 유?)", and finally outputs the transcribed text. The configuration of the text output unit 170 will be described in detail later with reference to FIG. 4.

Figure 2:
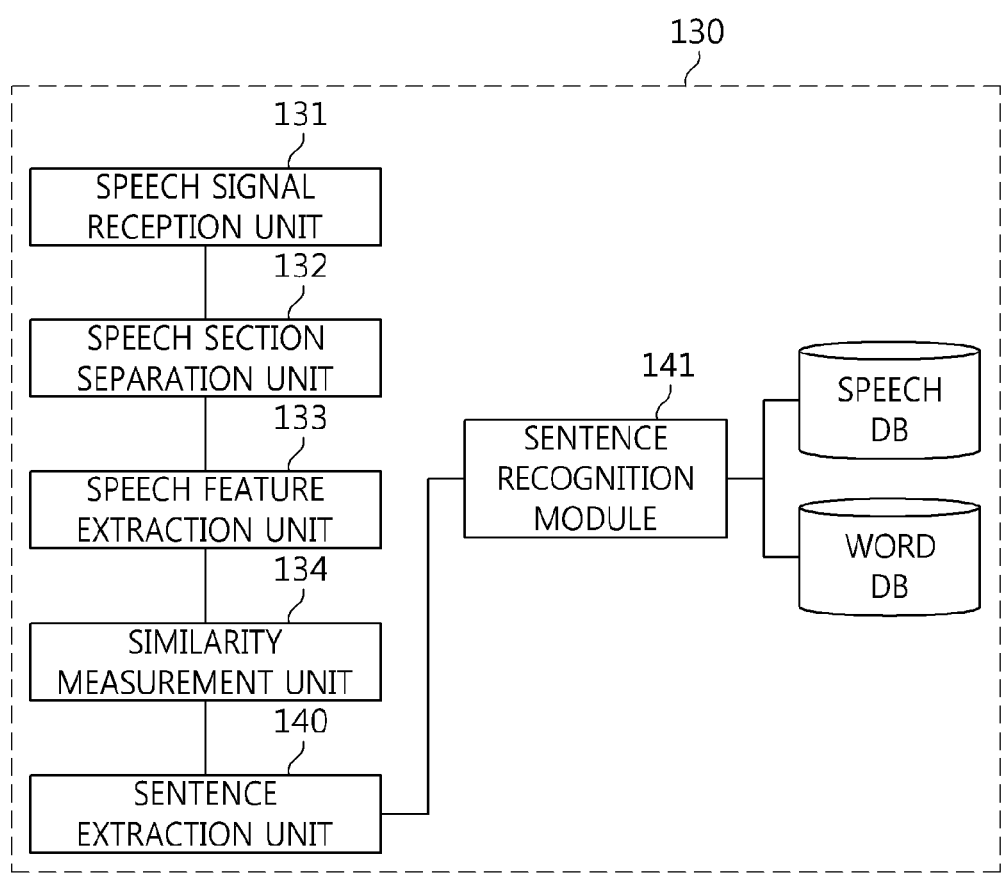
FIG. 2 is a detailed configuration diagram showing a sentence recognition unit employed in the automatic translation and interpretation apparatus according to an embodiment of the present invention.

FIG. 2 is a detailed configuration diagram showing the sentence recognition unit employed in the automatic translation and interpretation apparatus according to an embodiment of the present invention.

Referring to FIG. 2, the sentence recognition unit 130 according to the present invention includes a speech signal reception unit 131, a speech section separation unit 132, a speech feature extraction unit 133, a similarity measurement unit 134, and a sentence extraction unit 140.

The speech signal reception unit 131 receives a speech signal from the speech input unit 110.

The speech section separation unit 132 separates a speech section and a non-speech section from the received speech signal.

The speech feature extraction unit 133 extracts speech features from the speech section.

The similarity measurement unit 134 measures the similarity of each word of text data received from the text input unit 120, and a translation word (target word) having a maximum similarity. That is, the similarity measurement unit 134 extracts a word having a maximum similarity to the input word from a Korean-English translation word DB or an English-Korean translation word DB. An embodiment of the configuration of the similarity measurement unit 134 will be described in detail later with reference to FIG. 3.

The sentence extraction unit 140 extracts speech features or translation words in the form of a sentence in the first language using a sentence recognition module 141 constructed using a speech DB or a word DB, and displays the first language sentence on the screen of the mobile terminal. In this case, the sentence recognition module 141 is a module into which an acoustic model, a pronunciation dictionary, and a language model are constructed and integrated based on the speech DB or the word DB.

Figure 3:
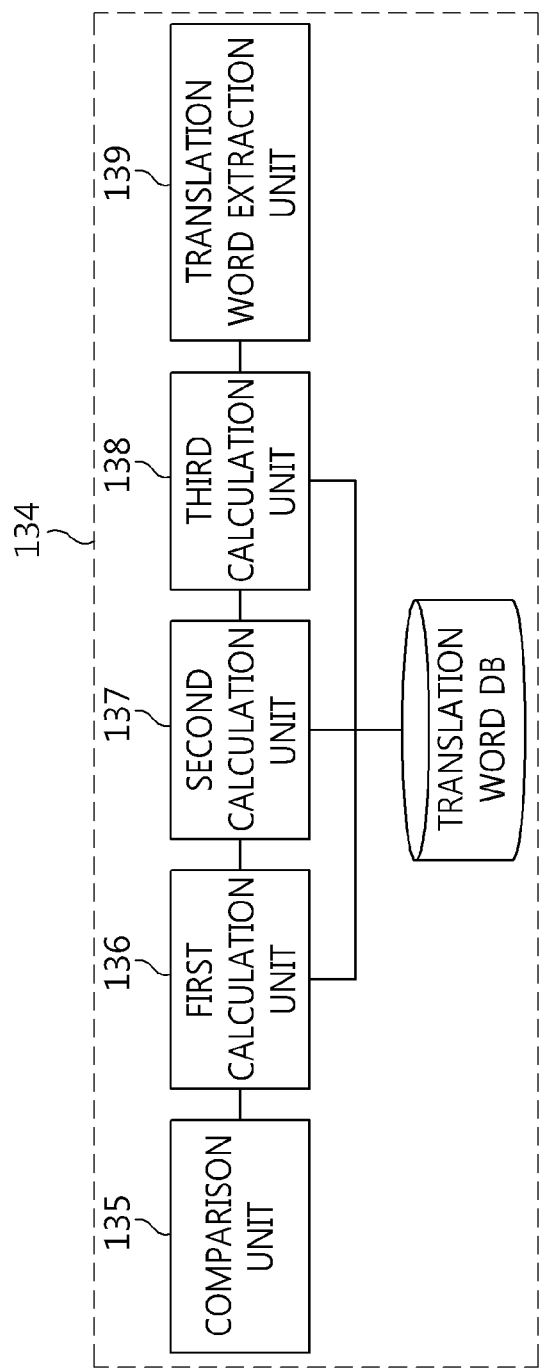
FIG. 3 is a detailed configuration diagram showing a similarity measurement unit employed in the sentence recognition unit of FIG. 2.

FIG. 3 is a detailed configuration diagram showing the similarity measurement unit employed in the sentence recognition unit of FIG. 2.

Referring to FIG. 3, the similarity measurement unit 134 according to the present invention includes a comparison unit 135, a first calculation unit 136, a second calculation unit 137, a third calculation unit 138, and a translation word extraction unit 139.

The comparison unit 135 compares words stored in the translation word DB with each word of input text. The comparison unit 135 compares each single word in the translation word DB with each word input in speech or text.

In this case, the translation word DB stores translation words including corresponding words in a second language into which words in a first language are translated, or corresponding words in the first language into which words in the second language are translated.

The first calculation unit 136 calculates a similarity by dividing the number of identical phonemes based on the results of the comparison by the number of phonemes of each word of the input text.

The second calculation unit 137 calculates a similarity by dividing the number of identical phonemes based on the results of the comparison by the number of phonemes of each word stored in the translation word DB.

The third calculation unit 138 calculates a similarity by dividing a minimum value of the similarity values calculated by the first calculation unit 136 and the second calculation unit 137 by the average of the number of phonemes of the word of the text and the number of phonemes of the word stored in the translation word DB. For example, the third calculation unit 138 outputs a value of 0.8 by the formula $4/[(4+6)/2]$ when the phonemes of the input word is 4 and the number of phonemes of the word stored the translation word DB is 6.

The translation word extraction unit 139 extracts a translation word having a maximum similarity, which is similar to the similarity values calculated by the first calculation unit 136, the second calculation unit 137, and the third calculation unit 138, from the translation word DB, and displays the extracted word on the screen of the mobile terminal.

The similarity between words measured by the similarity measurement unit 134 is calculated as $A*B*C$, the similarities of the input words are measured using the same method, and thus translation words are extracted. That is, even if text "와싱톤" is directly input so as to output "Washington", the similarity measurement unit 134 may extract "와싱턴/Washington" having a high similarity to the Korean word from the Korean/English translation word DB.

Figure 4:
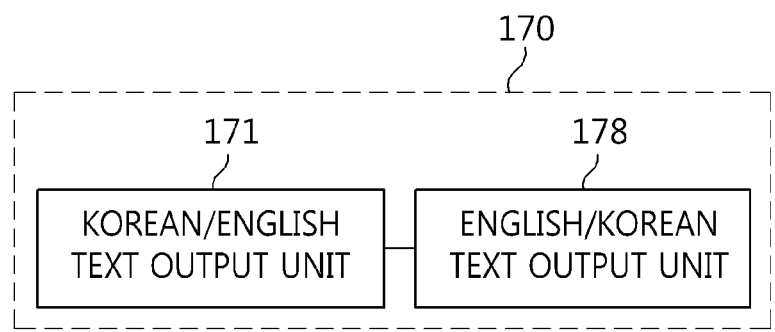
FIG. 4 is a detailed configuration diagram showing a text output unit employed in the automatic translation and interpretation apparatus according to an embodiment of the present invention.

FIG. 4 is a detailed configuration diagram showing the text output unit employed in the automatic translation and interpretation apparatus according to an embodiment of the present invention.

Referring to FIG. 4, the text output unit 170 according to the present invention includes a Korean/English text output unit 171 for converting the uttered sound of a translated second language sentence into text transcribed in Roman letters (characters) and outputting Romanized text when the first language is English and the second language is Korean, and an English/Korean text output unit 178 for converting the uttered sound of the translated second language sentence into text transcribed in Korean letters and outputting the Korean text when the first language is Korean and the second language is English.

An embodiment of the Korean/English text output unit 171 will be described in detail later with reference to FIGS. 5 and 6, and an embodiment of the English/Korean text output unit 178 will be described in detail later with reference to FIGS. 7 and 8.

Figure 5:
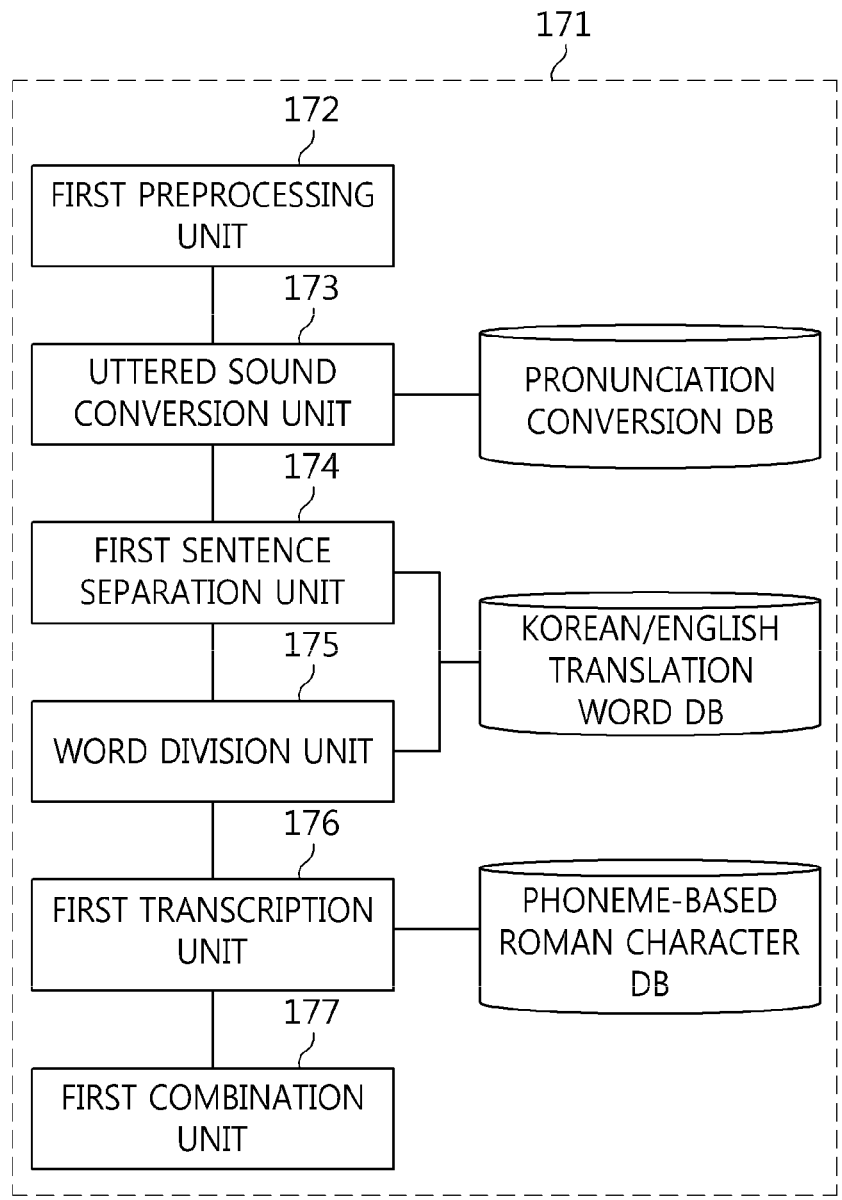
FIG. 5 is a detailed configuration diagram showing a Korean/English text output unit employed in the text output unit of FIG. 4.
Figure 6:
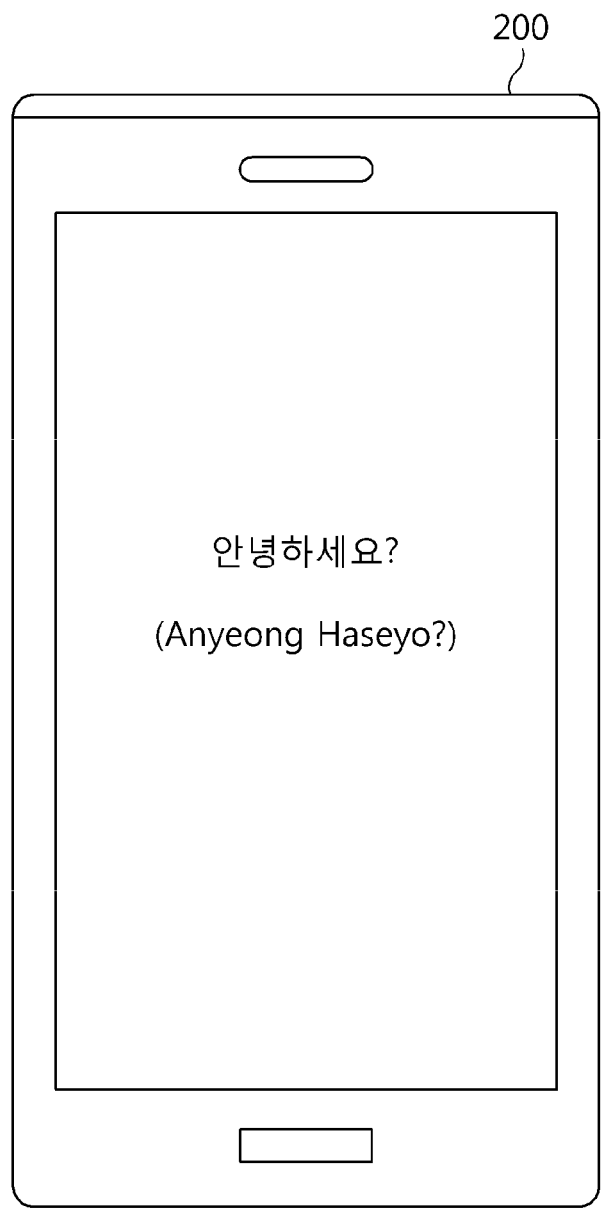
FIG. 6 is a diagram showing the results of the output of the Korean/English text output unit of FIG. 5.

FIG. 5 is a detailed configuration diagram showing the Korean/English text output unit employed in the text output unit of FIG. 4, and FIG. 6 is a diagram showing the results of the output of the Korean/English text output unit of FIG. 5.

Referring to FIG. 5, the Korean/English text output unit 171 according to the present invention includes a first preprocessing unit 172, an uttered sound conversion unit 173, a first sentence separation unit 174, a word division unit 175, a first transcription unit 176, and a first combination unit 177.

The first preprocessing unit 172 performs preprocessing to eliminate special symbols from a translated sentence in a second language. In this case, the first preprocessing unit 172 eliminates special symbols other than punctuation marks from the second language sentence.

The uttered sound conversion unit 173 converts the uttered sound of the sentence in the second language into the uttered sound of a sentence in a first language using a pre-constructed pronunciation conversion DB. In this case, the pronunciation conversion DB is constructed by collecting words in which variation in pronunciation occurs in an utterance procedure. For example, those words include Korean words such as " 국민/궁민 ", " 신라/실라 ", and " 밥물/밤물 ."

The first sentence separation unit 174 separates the translated sentence in the second language into words by word spacing, using a pre-constructed Korean/English translation word DB. The first sentence separation unit 174 searches the pre-constructed Korean/English translation word DB for individual words, and immediately combines found words via the first combination unit if the words are found to be present in the DB. In this case, the Korean/English translation word DB is constructed by basically referring to a Korean pronunciation dictionary and by adding various Korean/English translation words of various compound proper nouns to the DB. For example, various compound proper nouns include words, such as "제주스파/Jeju_spa" and " 샤브샤브 /Shabushabu".

The word division unit 175 divides each word separated by the pre-constructed Korean/English translation word DB into syllables and phonemes. That is, the word division unit 175 divides the word into syllables for conversion into Roman letters, and sub-divides each syllable into phonemes to obtain an initial consonant (sound), a medial vowel, and a final consonant, wherein punctuation marks such as a question mark (?) and a period (.) are maintained without change.

The first transcription unit 176 transcribes the converted uttered sound in phoneme-based Romanized text using a pre-constructed phoneme-based Roman letter DB. In this case, the phoneme-based Roman letter DB is composed of translation relationships between corresponding Korean phonemes and Roman letters, and is constructed in different manners depending on whether a phoneme corresponds to an initial consonant or a final consonant even in the case of the same phoneme. For example, there may be relationships such as "ㄱ/k", "ㄱ/g", "ㄲ/kk", "ㅏ/a", and "ㅓ/eo." Further, if there is no syllable having a final consonant, a special symbol may be applied to the Roman letter conversion procedure.

The first combination unit 177 combines the phonemes transcribed in the Romanized text into syllables and words and outputs the results of the combination. For example, as shown in FIG. 6, the first combination unit 177 outputs the uttered sound of "안녕하세요 ?" in text "(Annyeong Haseyo?)" via the screen of a mobile terminal 200. In this case, the first combination unit 177 may change the first letter of each word or each syllable to a capital letter and display the resulting text on the mobile terminal.

Figure 7:
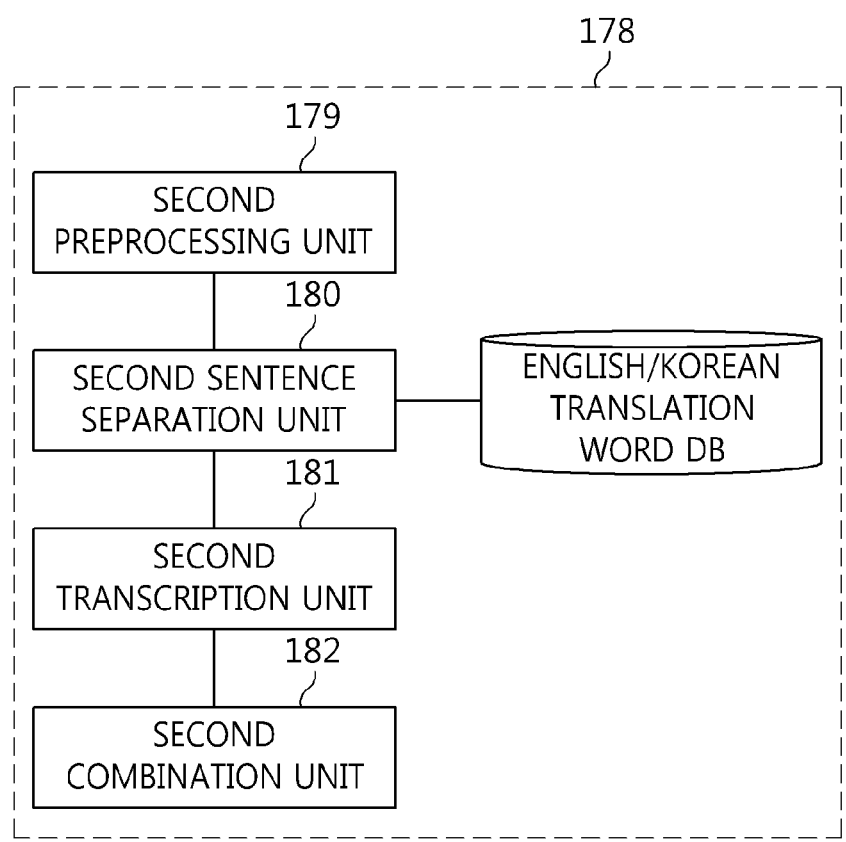
FIG. 7 is a detailed configuration diagram showing an English/Korean text output unit employed in the text output unit of FIG. 4.
Figure 8:
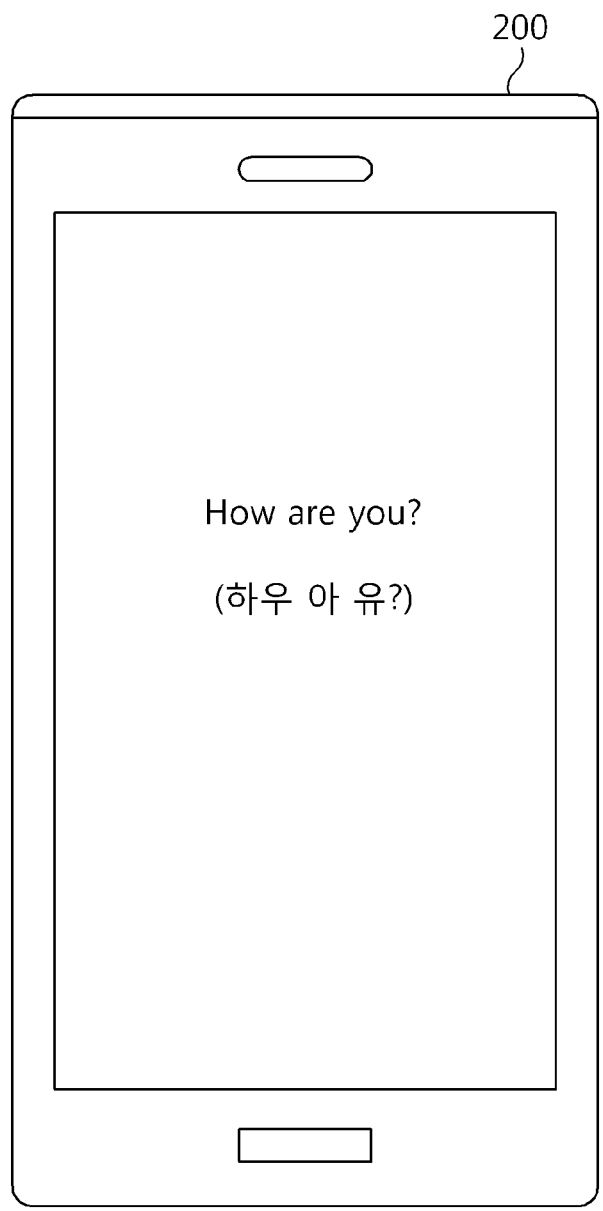
FIG. 8 is a diagram showing the results of the output of the English/Korean text output unit of FIG. 6.

FIG. 7 is a detailed configuration diagram showing the English/Korean text output unit employed in the text output unit of FIG. 4, and FIG. 8 is a diagram showing the results of the output of the English/Korean text output unit of FIG. 6.

Referring to FIG. 7, the English/Korean text output unit 178 according to the present invention includes a second preprocessing unit 179, a second sentence separation unit 180, a second transcription unit 181, and a second combination unit 182.

The second preprocessing unit 17 performs preprocessing to eliminate special symbols from a translated sentence in a second language. The second preprocessing unit 179 eliminates special symbols other than punctuation marks from the sentence in the second language.

The second sentence separation unit 180 separates the translated sentence in the second language into words by word spacing, using a pre-constructed English/Korean translation word DB. In this case, the English/Korean translation word DB is configured such that Korean unit phoneme translation DBs for individual unit phonemes of English utterance are constructed with reference to an English pronunciation dictionary. For example, relationships such as "y uw/ 유 " and "b iy l/빌" may be included. By means of this, each unit phoneme of each English word defined by a combination of uttered sound-based phonemes as in the case of the English pronunciation dictionary may be converted into the unit phoneme or syllable of Korean. The uttered sound-based translation word DB may be constructed. For example, the uttered sound-based translation words include "Shop/샵 " and "Front/ 프런트 " Such an English/Korean translation word DB is constructed by basically using head words of the English pronunciation dictionary, and by adding a plurality of proper nous to the DB.

The second transcription unit 181 transcribes the uttered sound of each separated word in Korean text.

The second combination unit 182 combines the words transcribed in Korean text into a sentence, performs post-processing, such as the addition of punctuation marks, and outputs a final sentence. For example, as shown in FIG. 8, the second combination unit 182 outputs the uttered sound of "How are you?" in text "(하우 아 유 ?)" via the screen of a mobile terminal 200.

Figure 9:
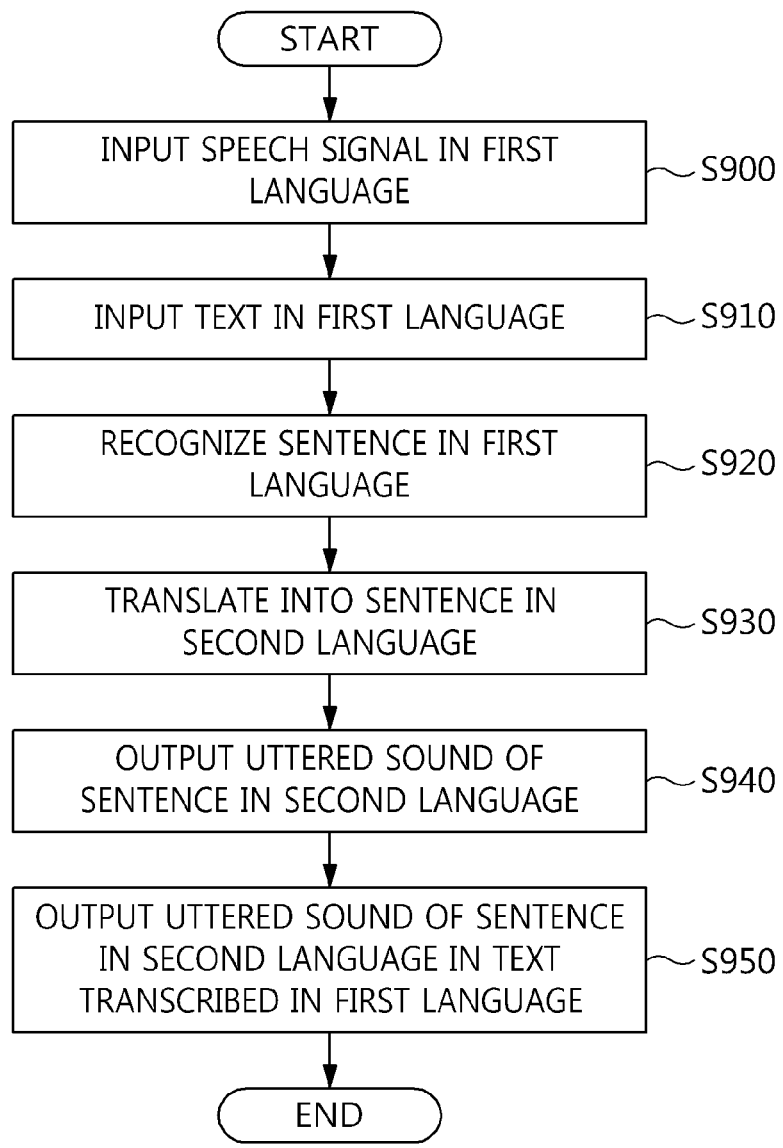
FIG. 9 is a flowchart showing an automatic translation and interpretation method according to an embodiment of the present invention.

FIG. 9 is a flowchart showing an automatic translation and interpretation method according to an embodiment of the present invention.

Referring to FIG. 9, the automatic translation and interpretation method according to the present invention is a method using the above-described automatic translation and interpretation apparatus, and thus redundant descriptions thereof will be omitted here.

First, a speech signal in a first language is input at step S900.

Text in the first language is input at step S910.

Then, a sentence in the first language desired to be translated is recognized by extracting speech features from the input speech signal or by measuring the similarity of each word of the input text at step S920. A method of recognizing the sentence in the first language will be described in detail later with reference to FIG. 10.

The recognized sentence in the first language is translated into a sentence in a second language at step S930.

Next, the uttered sound of the translated sentence in the second language is output in speech at step S940.

Finally, the uttered sound of the translated sentence in the second language is converted into text transcribed in the first language and the text in the first language is output at step S950. A method of outputting the uttered sound in text will be described in detail later with reference to FIGS. 13 and 14.

Figure 10:
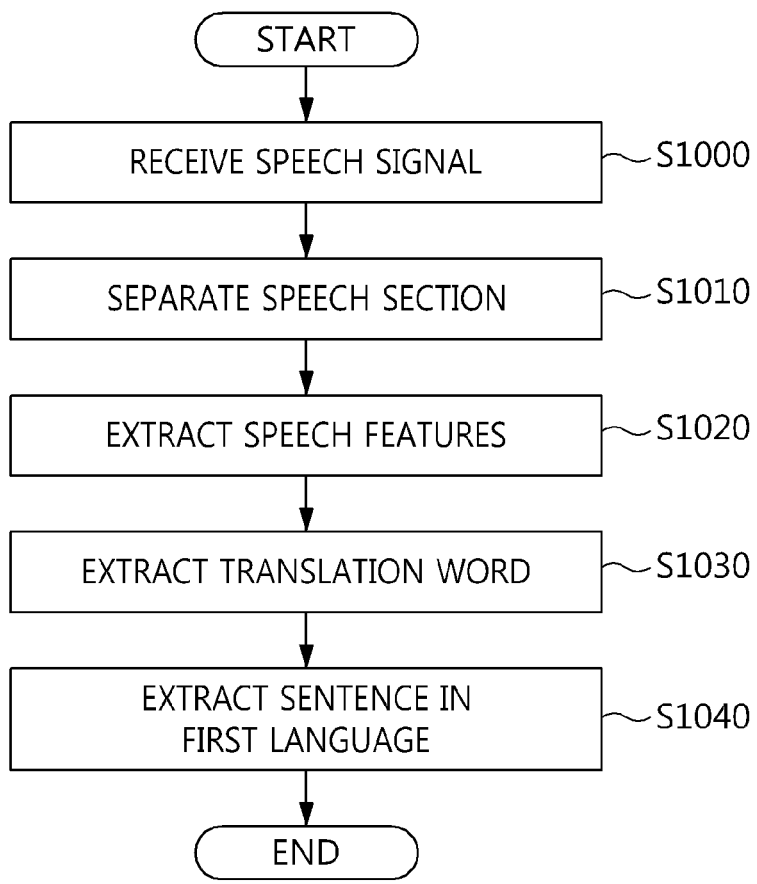
FIG. 10 is a detailed flowchart showing the step of recognizing a sentence in a first language desired to be translated in FIG. 9.

FIG. 10 is a detailed flowchart showing the step of recognizing the sentence in the first language desired to be translated in FIG. 9.

Referring to FIG. 10, a speech signal is received at step S1000.

A speech section and a non-speech section are separated from the received speech signal at step S1010.

Then, speech features are extracted from the speech section at step S1020.

Next, the similarity of each word in text data is measured and then a translation word having a maximum similarity is extracted at step S1030. A method of extracting a translation word based on the measurement of the similarity will be described in detail later with reference to FIG. 11.

Finally, the speech features or translation words are extracted in the form of the sentence in the first language using a sentence recognition module which is based on an acoustic model, a pronunciation dictionary, and a language model constructed using a speech DB or a word DB, and the sentence in the first language is output at step S1040.

Figure 11:
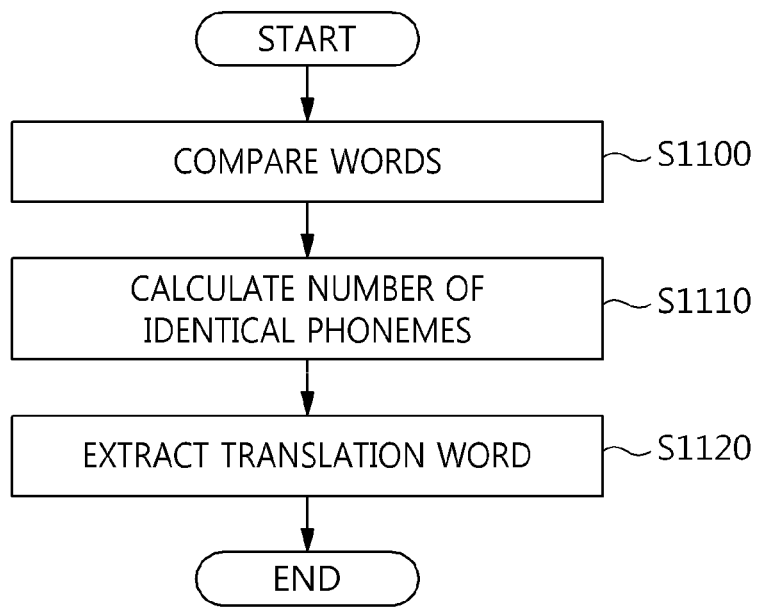
FIG. 11 is a detailed flowchart showing the step of extracting a translation word having a maximum similarity in FIG. 10.
Figure 12:
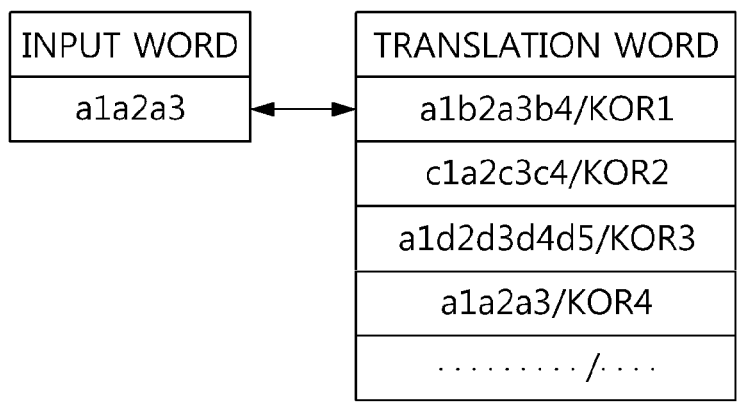
FIG. 12 is a diagram showing a method of comparing each word of input text with words stored in a translation word DB at the step of comparing the words stored in the translation word DB with each word of the input text in FIG. 11.

FIG. 11 is a detailed flowchart showing the step of extracting a translation word having a maximum similarity in FIG. 10, and FIG. 12 is a diagram showing a method of comparing each word of input text with words stored in a translation word DB at the step of comparing the words stored in the translation word DB with each word of the input text in FIG. 11.

Referring to FIG. 11, the words stored in the translation word DB are compared with each word of the input text at step S1100. For example, as shown in FIG. 12, the input word "a1a2a3", which is input in speech or text, is compared with translation words, such as "a1b2a3b4/KOR1" and "c1a2c3c4/KOR2" stored in the translation word DB.

Next, the number of identical phonemes is calculated based on the results of the comparison at step S1110. This step is configured to calculate a similarity by dividing the number of identical phonemes based on the results of the comparison by the number of phonemes of each word of the input text, calculate a similarity by dividing the number of identical phonemes based on the results of the comparison by the number of phonemes of each word stored in the translation word DB, and calculate a similarity by dividing a minimum value of the above calculated similarity values by the average of the number of phonemes of the word of the text and the number of phonemes of the word stored in the translation word DB.

Finally, a translation word having a maximum similarity, which is similar to the similarity values calculated at step S1100, is extracted from the translation word DB at step S1120.

Figure 13:
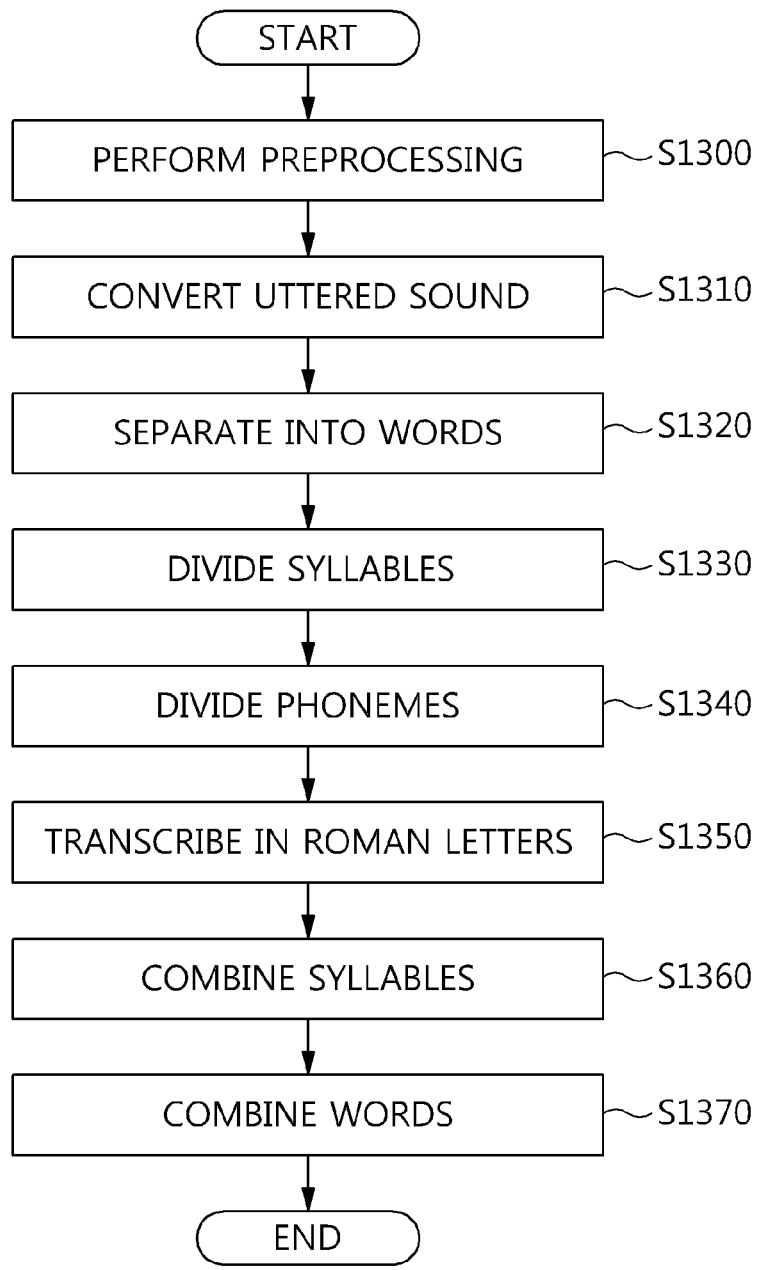
FIG. 13 is a detailed flowchart showing a method of converting uttered sound of a Korean sentence into Roman letters and outputting the Roman letters at the step of converting the uttered sound of a sentence in a second language into text transcribed in a first language and outputting the text in FIG. 9.

FIG. 13 is a detailed flowchart showing a method of converting the uttered sound of a Korean sentence into Roman letters and outputting the Roman letters at the step of converting the uttered sound of the sentence in the second language into text transcribed in the first language and outputting the text in FIG. 9.

Referring to FIG. 13, when the uttered sound of the translated sentence in the second language is converted in text transcribed in Roman letters and the Romanized text is output in the case where the first language is English and the second language is Korean, preprocessing is performed to eliminate special symbols from the translated sentence in the second language at step S1300.

Next, the uttered sound of the translated sentence in the second language is converted into uttered sound in the first language using a pre-constructed pronunciation conversion DB at step S1310.

The translated second language sentence is separated into words by word spacing at step S1320.

Each separated word is divided into syllables and phonemes at steps S1330 and S1340.

Then, the converted uttered sound is transcribed in text of phoneme-based Roman letters using a pre-constructed phoneme-based Roman letter DB at step S1350.

The phonemes transcribed in the Romanized text are combined into syllables and words, and the results of the combination are output at steps S1360 and S1370. For example, when the uttered sound of "안녕하세요?" is output in text "(Annyeong Haseyo?)" via the screen of a mobile terminal 200 at steps S1360 and S1370.

Figure 14:
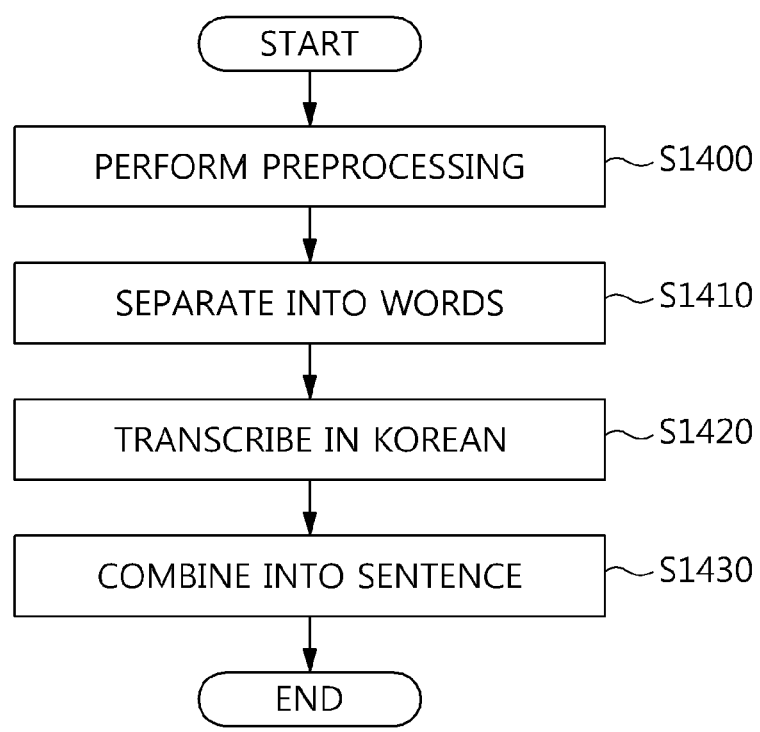
FIG. 14 is a detailed flowchart showing a method of converting uttered sound of an English sentence into Korean letters and outputting the Korean letters at the step of converting the uttered sound of a sentence in a second language into text transcribed in the first language and outputting the text in FIG. 8.

FIG. 14 is a detailed flowchart showing a method of converting the uttered sound of an English sentence into Korean letters and outputting the Korean letters at the step of converting the uttered sound of the sentence in the second language into text transcribed in the first language and outputting the text in FIG. 8.

Referring to FIG. 14, in the case where the uttered sound of the translated sentence in the second language is converted into text transcribed in Korean and the Korean text is output when the first language is Korean and the second language is English, preprocessing is performed to eliminate special symbols from the translated second language sentence at step S1400.

Then, the translated second language sentence is separated into words by word spacing at step S1410.

The uttered sound of each separated word is transcribed in Korean text at step S1420.

The individual words transcribed in Korean text are combined into a sentence, and then the sentence is output at step S1430. For example, the uttered sound of "How are you?" is output in the form of text "(하우 아 유 ?)" via the screen of a mobile terminal 200 at step S1430.

In this way, the automatic translation and interpretation apparatus and method according to the present invention are advantageous in that they not only automatically translate a first language into a second language based on uttered sound or text in the first language, but also output the uttered sound of the translated second language in speech or text transcribed in the first language, so that an opportunity to reproduce the translated and interpreted second language in a user's own voice is provided, thus allowing persons who use different languages to easily communicate with each other.

Further, the present invention is advantageous in that, when there is a typing error or an orthographic error upon inputting text in a first language, intended words can be extracted via the measurement of a similarity between words, so that the first language can be accurately translated and interpreted into the second language, thus improving the quality of automatic translation and interpretation service.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An automatic translation and interpretation apparatus comprising:
a speech input unit for receiving an audio speech signal in a first language;
a text input unit for receiving text in the first language;
a sentence recognition unit for recognizing a sentence in the first language desired to be translated, the sentence recognition unit configured to recognize the sentence in the first language upon the speech input unit receiving the audio speech signal by extracting speech features from the audio speech signal received by the speech input unit, and the sentence recognition unit further configured to recognize the sentence in the first language upon the text input unit receiving the text by measuring a similarity of each word of the text received by the text input unit;
a translation unit for translating the recognized sentence in the first language into a sentence in a second language;
a speech output unit for outputting uttered sound of the translated sentence in the second language in speech; and
a text output unit for converting the uttered sound of the translated sentence in the second language into text transcribed in the first language and outputting the text.

2. The automatic translation and interpretation apparatus of claim 1, wherein the sentence recognition unit comprises:
a speech signal reception unit for receiving the audio speech signal from the speech input unit;
a speech section separation unit for separating a speech section and a non-speech section from the received audio speech signal;
a speech feature extraction unit for extracting the speech features from the speech section;
a similarity measurement unit for measuring the similarity of each word of the text received from the text input unit and extracting a translation word having a maximum similarity; and
a sentence extraction unit for extracting the speech features or the translation word in a form of the sentence in the first language using a sentence recognition module that is based on an acoustic model, a pronunciation dictionary, and a language model constructed using a speech database (DB) or a word DB, and outputting the sentence in the first language.

3. The automatic translation and interpretation apparatus of claim 2, wherein the similarity measurement unit comprises:
a comparison unit for comparing words stored in a translation word DB with each word of the text;
a first calculation unit for calculating a first similarity value by dividing a number of identical phonemes based on results of the comparison by a number of phonemes of each word of the text;
a second calculation unit for calculating a second similarity value by dividing the number of identical phonemes based on the results of the comparison by a number of phonemes of each word stored in the translation word DB;
a third calculation unit for calculating a third similarity value by dividing a minimum value of the first and second similarity values calculated by the first calculation unit and the second calculation unit by an average value of the number of phonemes of the word of the text and the number of phonemes of the word stored in the translation word DB; and
a translation word extraction unit for extracting, from the translation word DB, a translation word having a maximum similarity, which is similar to the first to third similarity values calculated by the first calculation unit, the second calculation unit, and the third calculation unit.

4. The automatic translation and interpretation apparatus of claim 3, wherein the translation word DB stores translation words including corresponding words in the second language into which words in the first language are translated, or corresponding words in the first language into which words in the second language are translated.

5. The automatic translation and interpretation apparatus of claim 1, wherein the text output unit comprises a Korean/English text output unit for converting the uttered sound of the translated sentence in the second language into text transcribed in Roman letters and outputting Romanized text when the first language is English and the second language is Korean.

6. The automatic translation and interpretation apparatus of claim 5, wherein the Korean/English text output unit comprises:
a first preprocessing unit for performing preprocessing to eliminate special symbols from the translated sentence in the second language;
an uttered sound conversion unit for converting the uttered sound of the sentence in the second language into uttered sound in the first language using a pre-constructed pronunciation conversion DB;
a first sentence separation unit for separating the sentence in the second language into words by word spacing using a pre-constructed Korean/English translation word DB;
a word division unit for dividing each separated word into syllables and phonemes using the pre-constructed Korean/English translation word DB;
a first transcription unit for transcribing the converted uttered sound in phoneme-based Romanized text using a pre-constructed phoneme-based Roman letter DB; and
a first combination unit for combining phonemes of the Romanized text into syllables and words and outputting results of the combination.

7. The automatic translation and interpretation apparatus of claim 1, wherein the text output unit comprises an English/Korean text output unit for converting the uttered sound of the translated sentence in the second language into text transcribed in Korean letters and outputting the Korean text when the first language is Korean and the second language is English.

8. The automatic translation and interpretation apparatus of claim 7, wherein the English/Korean text output unit comprises:
a second preprocessing unit for performing preprocessing to eliminate special symbols from the translated sentence in the second language;
a second sentence separation unit for separating the translated sentence in the second language into words by word spacing using a pre-constructed English/Korean translation word DB;
a second transcription unit for transcribing uttered sound of each separated word in Korean text; and
a second combination unit for combining words of the Korean text into a sentence and outputting the sentence.

9. An automatic translation and interpretation method comprising:

receiving, by a speech input unit, an audio speech signal in a first language;

recognizing, by a sentence recognition unit, a sentence in the first language desired to be translated by extracting speech features from the audio speech signal received by the speech input unit;

translating, by a translation unit, the recognized sentence in the first language into a sentence in a second language;

outputting, by a speech output unit, uttered sound of the translated sentence in the second language in speech; and converting, by a text output unit, the uttered sound of the translated sentence in the second language into text transcribed in the first language and outputting the text.

10. The automatic translation and interpretation method of claim 9, wherein recognizing the sentence in the first language desired to be translated comprises:

receiving the audio speech signal from the speech input unit;

separating a speech section and a non-speech section from the received audio speech signal;

extracting the speech features from the speech section; and extracting the speech features in a form of the sentence in the first language using a sentence recognition module that is based on an acoustic model, a pronunciation dictionary, and a language model constructed using a speech DB or a word DB, and outputting the sentence in the first language.

11. The automatic translation and interpretation method of claim 9, wherein converting the uttered sound of the translated sentence in the second language into text transcribed in the first language and outputting the text comprises converting the uttered sound of the translated sentence in the second language into text transcribed in Korean letters and outputting the Korean text when the first language is Korean and the second language is English.

12. The automatic translation and interpretation method of claim 11, wherein converting the uttered sound of the translated sentence in the second language into text transcribed in Korean letters and outputting the Korean text when the first language is Korean and the second language is English comprises:

performing preprocessing to eliminate special symbols from the translated sentence in the second language;

separating the translated sentence in the second language into words by word spacing;

transcribing uttered sound of each separated word in Korean text; and combining words transcribed in the Korean text into a sentence and outputting the sentence.

13. The automatic translation and interpretation method of claim 9, wherein converting the uttered sound of the translated sentence in the second language into text transcribed in the first language and outputting the text comprises converting the uttered sound of the translated sentence in the second language into text transcribed in Roman letters and outputting Romanized text when the first language is English and the second language is Korean.

14. The automatic translation and interpretation method of claim 13, wherein converting the uttered sound of the translated sentence in the second language into the text transcribed in Roman letters and outputting the Romanized text when the first language is English and the second language is Korean comprises:

performing preprocessing to eliminate special symbols from the translated sentence in the second language;

converting the uttered sound of the sentence in the second language into uttered sound in the first language using a pre-constructed pronunciation conversion DB;

separating the translated sentence in the second language into words by word spacing;

dividing each separated word into syllables and phonemes;

transcribing the converted uttered sound in phoneme-based Romanized text using a pre-constructed phoneme-based Roman letter DB; and combining phonemes of the Romanized text into syllables and words and outputting results of the combination.

15. An automatic translation and interpretation method comprising:

receiving, by a text input unit, text in a first language;

recognizing, by a sentence recognition unit, a sentence in the first language desired to be translated by measuring a similarity of each word of the text received by the text input unit;

translating, by a translation unit, the recognized sentence in the first language into a sentence in a second language;

outputting, by a speech output unit, uttered sound of the translated sentence in the second language in speech; and converting, by a text output unit, the uttered sound of the translated sentence in the second language into text transcribed in the first language and outputting the text.

16. The automatic translation and interpretation method of claim 15, wherein converting the uttered sound of the translated sentence in the second language into text transcribed in the first language and outputting the text comprises converting the uttered sound of the translated sentence in the second language into text transcribed in Roman letters and outputting Romanized text when the first language is English and the second language is Korean.

17. The automatic translation and interpretation method of claim 15, wherein recognizing the sentence in the first language desired to be translated comprises:

measuring a similarity of each word of the text received by the text input unit, and extracting a translation word having a maximum similarity; and extracting the translation word in a form of the sentence in the first language using a sentence recognition module that is based on an acoustic model, a pronunciation dictionary, and a language model constructed using a speech DB or a word DB, and outputting the sentence in the first language.

18. The automatic translation and interpretation method of claim 17, wherein measuring the similarity of each word of the text data received from the text input unit and extracting the translation word having the maximum similarity comprises:

comparing words stored in a translation word DB with each word of the input text;

calculating a similarity by dividing a number of identical phonemes based on results of the comparison by a number of phonemes of each word of the input text;

calculating a similarity by dividing the number of identical phonemes based on the results of the comparison by a number of phonemes of each word stored in the translation word DB;

calculating a similarity by dividing a minimum value of the calculated similarity values by an average of the number of phonemes of the word of the text and the number of phonemes of the word stored in the translation word DB; and extracting, from the translation word DB, a translation word having a maximum similarity, which is similar to the above calculated similarity values.

19. The automatic translation and interpretation method of claim 15, wherein converting the uttered sound of the translated sentence in the second language into text transcribed in the first language and outputting the text comprises converting the uttered sound of the translated sentence in the second language into text transcribed in Korean letters and outputting the Korean text when the first language is Korean and the second language is English.

20. The automatic translation and interpretation method of claim 19, wherein converting the uttered sound of the translated sentence in the second language into text transcribed in Korean letters and outputting the Korean text when the first language is Korean and the second language is English comprises:
- performing preprocessing to eliminate special symbols from the translated sentence in the second language;
- separating the translated sentence in the second language into words by word spacing;
- transcribing uttered sound of each separated word in Korean text; and
- combining words transcribed in the Korean text into a sentence and outputting the sentence.

* * * * *